United States Patent
Braun et al.

(10) Patent No.: US 7,239,463 B2
(45) Date of Patent: Jul. 3, 2007

(54) PRISM DEVICE AND COMBINED OPTICAL AND RADIO FREQUENCY BEAM STEERING SYSTEM

(75) Inventors: Leroy Braun, Ashburn, VA (US); Robert S. Winsor, Round Hill, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 257 days.

(21) Appl. No.: 11/072,641

(22) Filed: Mar. 7, 2005

(65) Prior Publication Data

US 2005/0195505 A1 Sep. 8, 2005

Related U.S. Application Data

(60) Provisional application No. 60/549,906, filed on Mar. 5, 2004.

(51) Int. Cl.
*G02B 5/04* (2006.01)
(52) U.S. Cl. .................. 359/837; 359/831; 359/557
(58) Field of Classification Search ............... 359/831, 359/837, 557
See application file for complete search history.

(56) References Cited

U.S. PATENT DOCUMENTS

| | | | | |
|---|---|---|---|---|
| 4,009,393 A | * | 2/1977 | Ashley et al. | 250/339.05 |
| 5,964,432 A | * | 10/1999 | Obkircher | 244/3.16 |
| 6,344,937 B1 | * | 2/2002 | Sparrold et al. | 359/837 |
| 2003/0151833 A1 | * | 8/2003 | Berman et al. | 359/831 |
| 2004/0057656 A1 | * | 3/2004 | Chu et al. | 385/17 |

* cited by examiner

*Primary Examiner*—Leonidas Boutsikaris
(74) *Attorney, Agent, or Firm*—Edell, Shapiro & Finnan, LLC (57) ABSTRACT

A prism device includes: a prism material having substantially the same index of refraction at first and second wavelengths; a first anti-reflection coating for reducing reflection of a first signal beam at the first wavelength; and a second anti-reflection coating for reducing reflection of a second signal beam at the second wavelength. The prism material can be silicon, which has substantially the same index of refraction at IR and RF wavelengths. In this case, the RF anti-reflection coating can be a layer of silicon dioxide (fused silica), which can be sandwiched between two IR anti-reflection coatings designed to minimize IR reflections between the surrounding air and the RF anti-reflection coating and between the RF anti-reflection coating and the prism material, respectively. Two or more of the prism devices can be used in a beam steering system to simultaneous direct the first and second signal beams in substantially the same direction.

41 Claims, 7 Drawing Sheets

PRISM DEVICE AND COMBINED OPTICAL AND RADIO FREQUENCY BEAM STEERING SYSTEM

CROSS REFERENCE TO RELATED APPLICATIONS

This application claims priority from U.S. Provisional Patent Application Ser. No. 60/549,906 entitled "Compact Combined Optical And Radio Frequency Beam Steering Mechanism For Optical/RF Communication Systems," and filed Mar. 5, 2004. The disclosure of the above-mentioned provisional application is incorporated herein by reference in its entirety.

BACKGROUND

An increasing interest is developing to incorporate both free-space optical and radio frequency (RF) transmission and reception capabilities into communication and sensor systems. For example, backup RF capabilities for use during inclement weather are being considered for modern optical communication systems. Also, airborne and air-to-ground systems generally require RF capability to operate through clouds. Likewise, certain sensor systems may be required to operate at both RF and optical frequencies, such as a sensor suite that includes both electronic warfare (EW) sensors operating at optical frequencies and a radar system operating at RF.

Such systems may require precise beam pointing over a wide range of pointing angles (i.e., a field of regard) for optimum performance and generally require high reliability, small size, and lightweight design. To date, gimbaled systems typically have been used to meet these requirements. Such systems move the entire optical system and RF system in azimuth and elevation to transmit and receive in a certain direction. To provide the required pointing accuracy, such systems tend to be rather large, heavy, and complex. This complexity in turn makes high reliability difficult and expensive to achieve.

Furthermore, such systems are not well suited for mounting onto an aircraft. Typical gimbal-based systems will either introduce excessive amounts of turbulence when mounted externally of an aircraft hull or will have a substantially restricted field of regard if placed within the airframe. Risley prism systems can be useful in these situations. By placing a set of prisms such that the outermost prism sits just within a conformal window on the aircraft, a communications terminal can have a large range of pointing angles while introducing virtually no turbulence onto the airframe.

However, existing prism systems, such as Risley prisms, generally cannot simultaneously transmit or simultaneously receive signals at RF and optical wavelengths in the same direction with one prism assembly. This is because materials from which prisms are typically formed tend to exhibit different indexes of refraction at different wavelengths (this phenomenon can be observed in the well-known context of a prism creating a rainbow of colored light due to a refractive index gradient across the visible spectrum). While existing Risley prisms could theoretically be used to transmit or receive both RF and optical signals, signal beams at these two wavelengths could not be steered simultaneously in the same direction. Rather, two initially co-linear beams having different wavelengths would exit the prism system at different angles and diverge as they travel through free space. Thus, two prism assemblies would be required to separately handle RF and optical signals, making the overall system more complex, bulky, heavy, and expensive. In the airborne context, this would lead to the RF and optical assemblies requiring two respective conformal windows or time sharing a single conformal window.

SUMMARY

In accordance with an exemplary embodiment of the present invention, a prism device, such as wedge-shaped prism, comprises a prism material having substantially the same index of refraction at a first wavelength and a second wavelength. The first and second wavelengths may differ by at least an order of magnitude. The prism material can be, for example, silicon, which has substantially the same index of refraction at radio frequency (RF) and infrared (IR) wavelengths.

The prism device can further include a plurality of anti-reflection coatings disposed on the prism material for reducing reflection of electromagnetic radiation at the first and second wavelengths. More specifically, at least a first anti-reflection coating reduces reflection of electromagnetic radiation at the first wavelength (e.g., optical wavelength) and a second anti-reflection coating reduces reflection of electromagnetic radiation at the second wavelength (e.g., RF wavelength). The optical anti-reflection coating can be one or more layers which can be formed of any of a variety of materials including, but not limited to: $HfO_2$, $Y_2O_3$, $MgF_2$, and ZnSe. The RF anti-reflection coating can include one or more layers. In accordance with one embodiment, the RF anti-reflection coating is a single layer of silicon dioxide (fused silica) having an effective thickness of approximately a quarter of the RF wavelength.

A third anti-reflection coating that reduces reflection of electromagnetic radiation at the first wavelength (e.g., optical wavelength) can be formed over the second anti-reflection coating, such that the first anti-reflection coating is between the second anti-reflection coating and the prism material, and the second anti-reflection coating is between the first anti-reflection coating and the third anti-reflection coating.

A beam steering assembly for simultaneously directing signal beams of first and second wavelengths can be constructed using a plurality of such prism devices. Specifically, a plurality of controllable prism devices are arranged relative to each other such that signal beams traveling through the prism devices are steerable over a field of regard by selectively moving the prisms, such that the controllable prism devices are capable of simultaneously directing the first and second signal beams in substantially the same direction. For example, the beam steering assembly may include two or three such prism devices arranged in series, which are selectively rotatable to steer signal beams.

The beam steering assembly can be employed in a communication device, a remote sensing system, or an optical/RF instrument, any of which can be ground-based, airborne, satellite-based, ship borne, or carried on an undersea vehicle. A beam steering system that employs such a beam steering assembly can also include first and second transmitters for respectively generating first and second signal beams at the two wavelengths, or first and second receivers for respectively receiving first and second signal beams at the two wavelengths, or both.

According to another aspect of the present invention, a method of simultaneously directing signal beams of first and second wavelengths includes: generating a first signal beam at the first wavelength; generating a second signal beam at the second wavelength; and simultaneously passing the first and second signal beams through a beam steering assembly including a plurality of controllable prism devices, wherein the controllable prism devices include: a prism material having substantially the same index of refraction at the first wavelength and the second wavelength, such that the beam steering assembly simultaneously directs the first and second signal beams in substantially the same direction.

In accordance with yet another aspect of the present invention, a method of manufacturing a prism device includes: forming a prism from a prism material (e.g., silicon) having substantially the same index of refraction at a first wavelength (e.g., IR) and a second wavelength (e.g., RF); forming a first anti-reflection coating over the prism, the first anti-reflection coating reducing reflection of electromagnetic radiation at the first wavelength; and forming a second anti-reflection coating over the prism, the second anti-reflection reducing reflection of electromagnetic radiation at the second wavelength. The second anti-reflection coating can be formed over the first anti-reflection coating. Each of the coatings can be a single layer or multiple layers. Where one of the coatings is an RF anti-reflection coating, the coating can be formed as a single layer of silicon dioxide (fused silica) having an effective thickness of approximately a quarter of the RF wavelength.

A third anti-reflection coating for reducing reflection of electromagnetic radiation at the first wavelength can be formed such that the first anti-reflection coating is between the second anti-reflection coating and the prism material, and the second anti-reflection coating is between the first anti-reflection coating and the third anti-reflection coating.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

According to the present invention, a prism is formed of a material whose index of refraction is substantially the same at RF and optical frequencies. In particular, it has been discovered that silicon, which is transmissive at both infrared (1R) and RF wavelengths, has substantially the same index of refraction at IR and RF wavelengths. Consequently, a wedge-shaped prism formed of silicon can simultaneously deflect an IR beam and a co-linear RF beam in substantially the same direction.

A compact and lightweight system for simultaneously steering RF and optical beams can be implemented by positioning two or three such wedge-shaped prisms in series and driving the prisms with respective independent rotary positioners. Typically, significant loss would result from the use of prisms for beam steering due to reflections that occur at each surface of each of the prisms. To reduce this problem, anti-reflection (AR) coatings that address both RF and optical frequencies are provided on the surfaces of the prisms.

Since the anti-reflection coatings are completely planar, a variety of materials can be chosen. The materials need to have high transparency at both optical and RF wavelengths to be useful. The index of refraction (or, equivalently, the dielectric coefficient) need not be the same at both wavelengths for the anti-reflection coatings to work. The prism, however, must have an index of refraction at the optical frequency that matches the value at the radio frequency, assuring that both beams are steered by the prisms simultaneously in the same direction.

Figure 1:
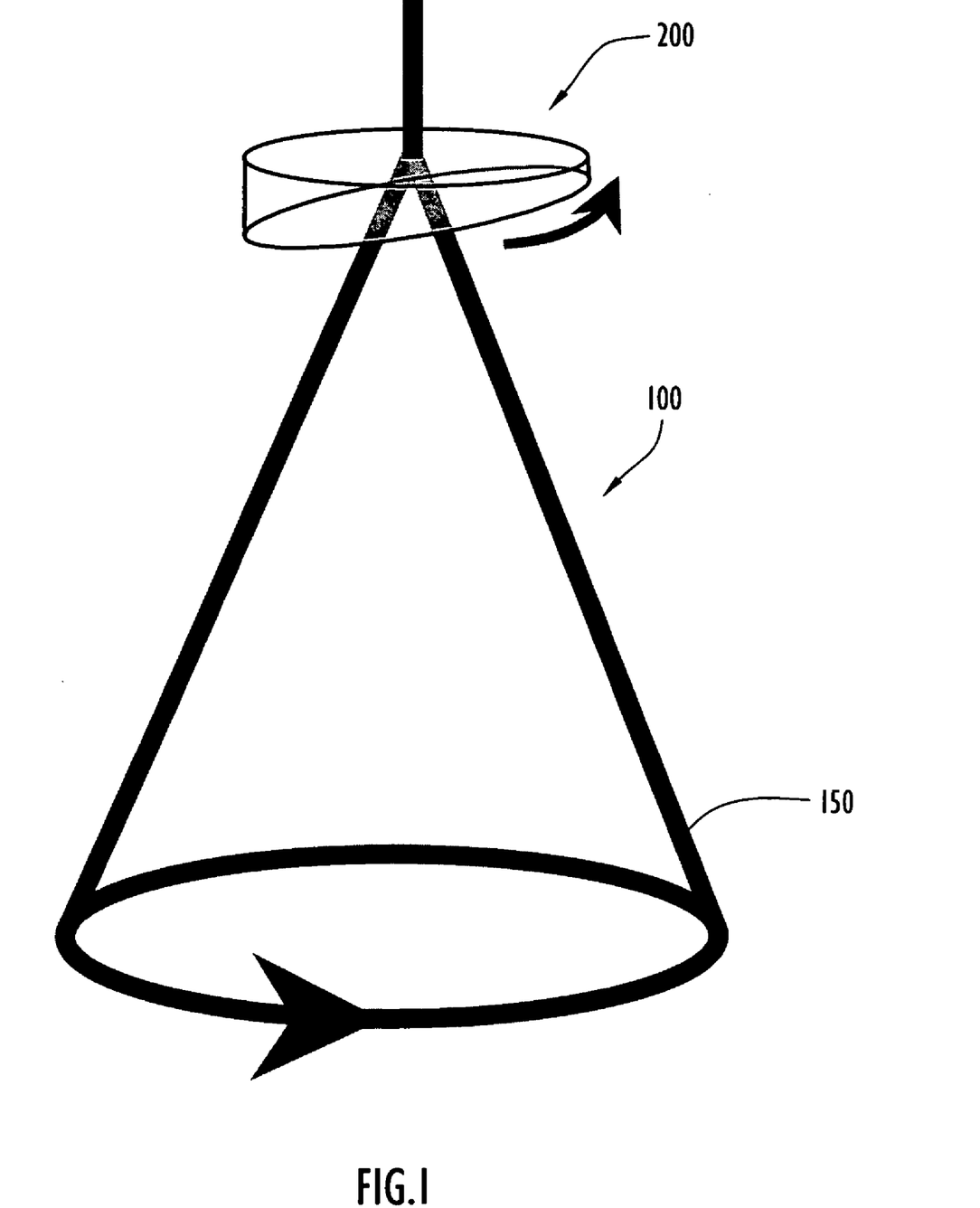
FIG. 1 is a perspective view of a rotatable wedge prism through which an electromagnetic beam passes.

FIG. 1 illustrates operation of a single prism 200 designed to deflect an incident electromagnetic beam. More specifically, the prism is generally disk-shaped with two substantially flat surfaces for receiving and transmitting electromagnetic radiation (e.g., signal beams). The flat surfaces are not parallel but rather angled with respect to one another to form a wedge shape (i.e., thickness of the disk decreases from one side to the other). The angle of deflection depends on the dimensions of the prism (e.g., thickness, wedge angle), the index of refraction of the prism material, and the orientation of the prism relative to the incident beam. The index of refraction for essentially lossless media is a function of the square root of the dielectric constant of the prism material, both of which tend to vary to some degree as a function of wavelength for most materials. When the prism is rotated azimuthally, the direction of the deflected beam changes accordingly. As shown in FIG. 1, by rotating prism 200, the beam sweeps through a path that traces the surface of an imaginary cone 100.

By adding a second prism in series with the first prism, the beam can be steered over a range of angles in two dimensions. After the beam exits the first prism, the beam travels through the second prism. In this case, the beam's angle of incidence on the second prism depends on the relative orientation of the first prism. Rotating the second prism can create a cone-shaped beam steering path, while rotation of the first prism can change the center of that cone by changing the angle of incidence (and therefore, the exit angle).

If the two-prism assembly is being used to transmit signals to or receive signals from a distant object (i.e., a transmitter/receiver or a target that is emitting or reflecting radiation), the angle of the object may change over time if relative motion exists between the prism assembly and the object. By selectively rotating the prisms, the angle of the beam can be steered such that the beam remains trained on the object over time. Likewise, the prisms can be rotated to scan the beam over a volume (e.g., in a search or initial acquisition mode).

Optionally, a third prism can be added in series with the first two prisms, which may improve tracking performance under certain conditions, such as with objects that instantaneously change direction near the center of the field of regard. Risley prisms are a well-known prism system that employs three prisms in this manner. With a third prism, multiple orientations of the prisms that will satisfy the same pointing direction become available. Faster initial acquisition may be possible, for instance, by solving for the shortest path, i.e., a path requiring the least rotation of the prism stages. Furthermore, to help isolation between optical channels, these orientations can be used to prevent reflections in undesirable directions.

However, relative to a three-prism beam steering assembly, a two-prism beam steering assembly is smaller in size, lower in weight and cost, uses less power, has higher throughput, fewer reflections, and a simpler control system and mechanical design. Thus, tradeoffs exist between two-prism beam steering assemblies and three-prism beam steering assemblies.

While prism systems such Risley prisms are known for steering beams at optical frequencies, such prism systems have rarely, if ever, been used in RF systems. Moreover, such systems have not previously been used to simultaneously transmit or receive signal beams traveling in the same direction at different wavelengths.

According to the present invention, a wedge-shaped prism for deflecting incident electromagnetic beams is fabricated from a material that has substantially the same index of refraction at two different wavelengths, thereby permitting a beam-steering system employing a number of prisms (e.g., two or three in series) to simultaneously steer beams of the two different wavelengths in the same direction. A prism has a "substantially the same" or a "matching" index of refraction at two different wavelengths (e.g., optical and RF) where two initially co-linear beams at the two wavelengths, upon exiting the prism, diverge only slightly or not at all over a distance. That is, the indices of refraction at the separate wavelengths can be considered substantially the same if the diffraction-limited beam divergence of the longest wavelength is less than the angular separation of the beams after going through the prism assembly. For use in practical communication and sensor systems, the index of refraction at the RF and optical frequencies must be similar enough that the RF and optical beams do not diverge or diverge only slightly over a considerable distance, such that a remote receiver or sensor can successfully receive both the RF and optical signals. The extent to which the RF and optical beams can diverge (and hence the extent to which the index of refraction can differ between the two wavelengths) depends, at least in part, on the beamwidth of the signals, the distance to the receiver or target, and the sensitivity of receiver.

In the exemplary embodiment, the prism is formed of silicon, which is virtually transparent and transmits electromagnetic radiation at both RF and IR wavelengths, despite being opaque at visible wavelengths. Importantly, silicon also has the unexpected and unusual property of having substantially the same dielectric constant (and hence index of refraction) over a range of RF and IR wavelengths (which differ by several orders of magnitude), which means that the deflection of signal beams by a silicon wedge can be relatively the same in both wavelength bands. Silicon also has a relatively high (compared to glass) dielectric constant, which can result in a relatively large beam deviation for a given prism wedge angle. This can simplify and reduce the size of optical designs. Most materials have a characteristically higher index of refraction at radio frequencies than at optical frequencies, and very few materials exhibit the characteristic of having a similar index of refraction at RF and optical frequencies, as silicon does. The fact that silicon is transmissive and has substantially the same index of refraction at RF and IR wavelengths is particularly advantageous, since systems that could benefit from use of signals at both these frequencies, such as those described above, can be greatly simplified by having a single prism assembly that simultaneously transmits or simultaneously receives two, different-wavelength beams. In particular, silicon prisms can be advantageously used in an optical/RF communications system employing wavelengths of about 1.5 microns in the near infrared and in the microwave region of the RF.

Nevertheless, while the exemplary embodiment of the invention employs silicon as the prism material, it will be appreciated that the invention is not limited to silicon prisms, and virtually any material that exhibits substantially the same index of refraction at two different operational wavelengths can be used. Germanium, for example, may also be a candidate material, although Germanium is not transparent below a few microns, which is beyond the telecommunication C-band. Moreover, the invention is not limited to the case of the two different wavelengths being at radio and optical frequencies, and any two, different wavelengths can be employed provided a prism material exists that has substantially the same index of refraction at the two wavelengths. In many practical applications, the wavelengths may differ considerably, such as by an order of magnitude or more, as is the case with RF and optical wavelengths, which differ by several orders of magnitude. As used herein and in the claims, the term "optical" refers generally to the range of wavelengths (and, equivalently, frequencies) of electromagnetic signals within which "optical" equipment (e.g., optical communication equipment, transmitters, receivers, etc.) typically operates, including the visible spectrum, infrared frequencies, and ultraviolet frequencies.

Silicon has a relatively large dielectric constant (about 11.7) and a correspondingly high index of refraction of about 3.5, which would cause a large reflection loss at the air-to-silicon interface. More specifically, the reflectivity of a material in air is given by the following equation:

$$R \cong \left(\frac{n-1}{n+1}\right)^2$$

with R being the reflectivity and n being the index of refraction for the prism. This relationship is at normal incidence and assumes the index of air to be 1. With an index of refraction of approximately 3.5 in the wavelength range of 1.5 to 1.6 microns (infrared), a reflectivity of approximately 30% would result for each bare surface of the prism, i.e., a surface without any anti-reflection coating, or about 50% per prism. A device incorporating three wedges of bare (uncoated) silicon, for instance, would have a transmission of only about 11% (even less at larger steering angles) and would have undesirable spurious reflections scattered in many directions. To alleviate this problem, it is desirable to employ anti-reflection coatings on each prism surface to minimize such reflections.

Since the prism of the present invention is intended to refract electromagnetic signals at two different wavelengths, the anti-reflection coating scheme must reduce reflections at both wavelengths while also addressing differences that may exist between adjacent materials in the prism structure (e.g., between the prism material and an innermost anti-reflection coating or layer, between adjacent layers of the anti-reflection coatings, and between air and an outermost anti-reflection coating or layer).

Figure 2:
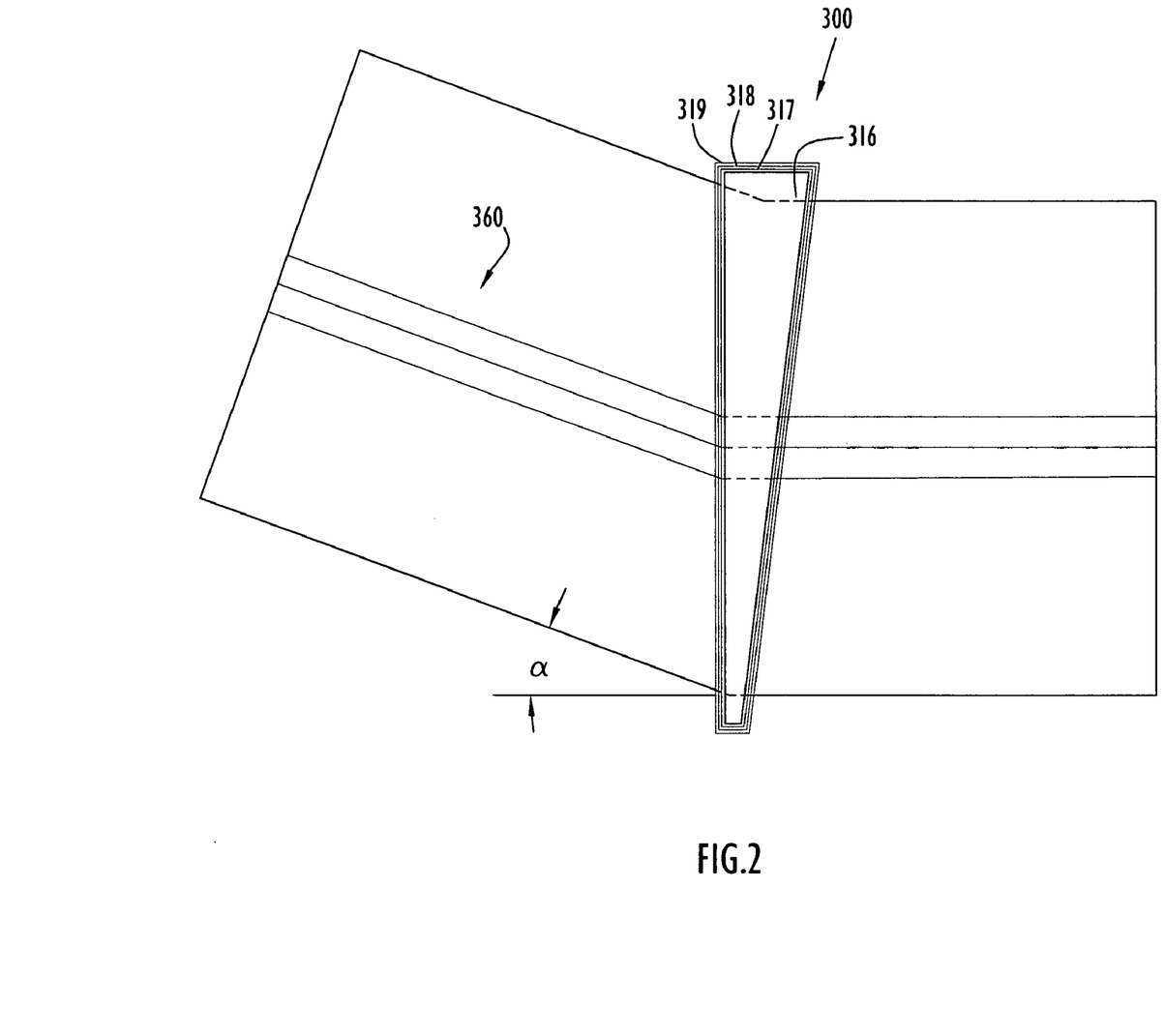
FIG. 2 is a cross-sectional side view of a prism coated with anti-reflection coatings in accordance with an exemplary embodiment of the present invention.

FIG. 2 is a diagrammatic cross-sectional side view of a prism device 300 suitable for simultaneously refracting two, different-wavelength incident electromagnetic beams at substantially the same angle in accordance with an exemplary embodiment of the present invention. Prism device 300 includes a wedge-shaped prism 316 comprising a prism material having substantially the same index of refraction at the two wavelengths (e.g., a silicon prism having the same index of refraction at RF and IR wavelengths). The three-dimensional shape of the prism is essentially that shown in FIG. 1, i.e., a section of a cylindrical disk, where the opposing faces that transmit and receive signals are not parallel, such that the disk-shaped prism essentially forms a wedge. The refractive index, the thickness, and wedge angle of prism 316 result in an incident electromagnetic beam 360 being refracted and exiting the prism at a deviation angle α relative to the incident beam. Due to the relatively high index of refraction of silicon, significant beam deflection can be achieved with relatively modest prism thickness and wedge angles, thereby permitting the use of thin, lightweight prisms. By way of a non-limiting example, the deviation angle α can be about 20°.

In the embodiment shown in FIG. 2, prism 316 is coated with three anti-reflection coatings: an inner-most IR anti-reflection coating 317; an intermediate RF anti-reflection coating 318, and an outer IR anti-reflection coating 319. The thickness, materials, and dielectric constants (equivalently, indexes of refraction) of the coatings are selected to minimize reflections at boundaries between adjacent materials while transmitting both wavelengths. Ideally, to minimize reflections, the dielectric constant of a coating is roughly equal to the square root of the dielectric constant of the material being coated. In the case of a prism 316 comprising silicon, which has an index of refraction of about 3.48, an innermost single-layer anti-reflection coating 317 should have an index of refraction of roughly 2.25 to effectively reduce reflections at the boundary between the intermediate layer (fused silica) and the prism material. Innermost anti-reflection coating 317 is designed to reduce reflections at IR wavelengths.

This IR anti-reflection coating 317 can comprise a single layer or multiple layers, and the coating's design can be tailored to maximize the anti-reflective properties in the vicinity of a particular operating wavelength (e.g., 1550 nm in the telecommunication C-band). More generally, the thickness and materials of the layers of coating 317 can be selected to minimize reflections at any operating wavelength from approximately 1.3 microns to out beyond 10 microns.

In the infrared band, standard optical dielectric anti-reflection coatings, such as those commonly used in optical systems, can be used in one or more layers of IR anti-reflection coating 317 shown in FIG. 2. Such optical coatings may include one or more of the following: $HfO_2$, $Y_2O_3$, $MgF_2$, and ZnSe. Evaporation techniques can be employed to form the layer(s) of the IR anti-reflection coating.

If the inner IR anti-reflection layer is formed of a single material (i.e., a single layer), the layer would need to have just the right index of refraction to work effectively, which limits the number of materials (and thicknesses) that can be used. In this case, the single-layer IR anti-reflection coating would have a thickness on the order of ⅓ of a micron. This thickness is on the order of a quarter wavelength (optical thickness) at typical IR wavelengths, making the dielectric constant of the coating effective in reducing reflections at IR wavelengths.

Figure 4:
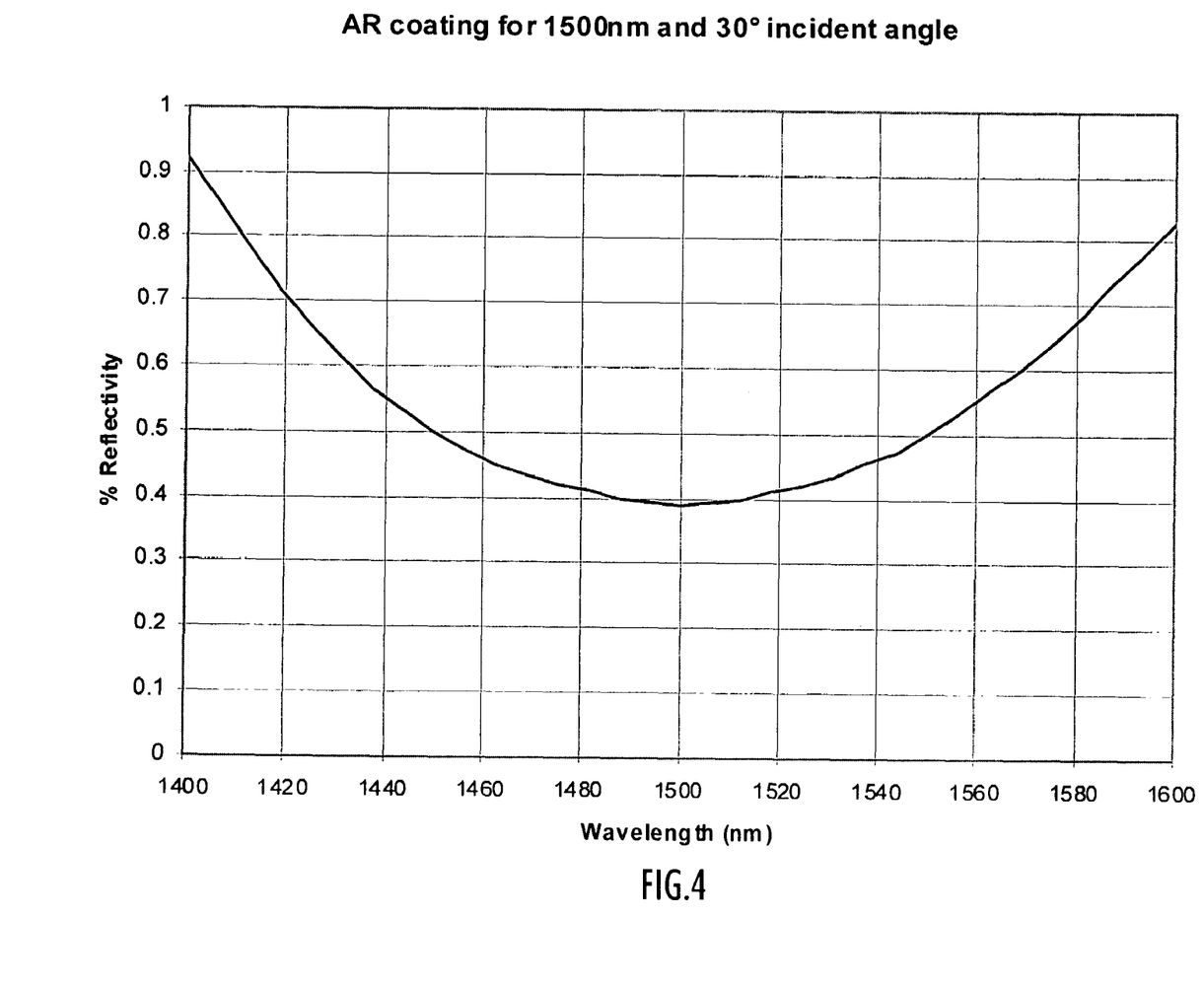
FIG. 4 is a graph showing the relationship between wavelength and percent (%) reflectivity for an anti-reflection coating of 1500 nm and a 30 degree incident angle.

If the inner IR anti-reflection coating is constructed from multiple layers, there is greater flexibility in selecting materials and layer thicknesses. For example, a multi-layer IR anti-reflection coating was found to provide excellent anti-reflection properties with a silicon prism at 1550 nm. The overall thickness of a multi-layer IR anti-reflection coating would still be on the order of a fraction of a micron. FIG. 4 illustrates a graph of reflectivity versus wavelength for an IR anti-reflection prism coating optimized for a wavelength of 1500 nm at an angle of incidence of 30°. The IR anti-reflection prism coating can similarly be optimized for the commonly used wavelength of 1550 nm, which would result in a plot similar to that shown in FIG. 4, but shifted 50 nm to the right.

While the dielectric constant of the inner IR anti-reflection coating is effective in reducing reflections at IR wavelengths, the sub-micron thickness of this coating results in this coating having virtually no impact on radiation at RF wavelengths. In general, the thickness of a dielectric layer must be on the order of at least ¹⁄₂₀ of a beam's wavelength for the refractive properties of the layer have any effect on the beam, and layers on the order of a quarter wavelength are generally effective in providing significant refraction. A layer having a thickness of less than ¹⁄₂₀ of a beam's wavelength is essentially invisible to the beam, and the layer's dielectric constant has virtually no refractive impact on the beam. The dielectric constant of the inner IR anti-reflection coating is meaningful at IR wavelengths, because the coating's thickness is significant compared to the IR wavelength. However, the wavelength of RF signals is orders of magnitude longer than the wavelength of IR signals, making the thickness of the IR anti-reflection coating a very small fraction of an RF wavelength and therefore insignificant for reducing reflections at RF wavelengths.

Referring again to FIG. 2, to reduce reflections at RF wavelengths, an RF anti-reflection coating 318 is applied to prism device 300 over IR anti-reflection coating 317. The design of coating 317 must jointly take into account the index of refraction (dielectric constant) of the material from which it is made as well as the thickness of the coating. Since the RF anti-reflection coating 318 must be a relatively thick coating (much thicker, for example, than the IR anti-reflection coating), it is preferable to form coating 318 with one layer. A single layer design, in turn, dictates what the dielectric constant of the single layer needs to be to effectively reducing reflections. In the case of a beam traveling from air into the prism and back to air (which, given the thickness of the IR anti-reflection coating layer, is essentially the case here at RF), the dielectric constant of the RF anti-reflection coating ideally would be the square root of the dielectric constant of the prism material.

The dielectric constant of silicon dioxide, commonly known as fused silica or synthetic quartz, is 3.4. Silicon dioxide is relatively transparent at RF and IR wavelengths, and its dielectric constant differs only slightly from the square root of the dielectric constant of silicon (11.7), making silicon dioxide an excellent candidate for the RF anti-reflection coating 318 in the case where prism 316 is made from silicon. The effective thickness of the RF anti-reflection coating is preferably about a quarter wavelength of the operating RF wavelength. By way of a non-limiting example, at the nominal angle of incidence for the prism surface, a fused silica (silicon dioxide) RF anti-reflection coating having an optical thickness of about a quarter wavelength (λ/4) would be about 4 millimeters thick for an RF of about 10 GHz. For an RF of 38 GHz, an appropriate effective thickness of a fused silica layer is about 1.02 mm.

The RF anti-reflection coating 318 can be constructed by placing a sheet of fused silica (with an effective thickness in the material equal to one-fourth the RF wavelength) in contact with each face of the silicon wedge prism with an optical adhesive between the coatings and the prism. However, it will be understood that the invention is not limited to any particular technique for forming the RF anti-reflection coating, and other techniques, such as Chemical Vapor Deposition (CVD), can be used to apply the RF anti-reflection coating.

The RF anti-reflection coating 318 itself will result in reflections at the boundary between air and coating 318, particularly at IR wavelengths. For example, in the exemplary embodiment, the fused silica constituting coating 318 has an index of refraction of about 1.5 which will cause significant reflections with air, which has a nominal index of refraction of 1. Accordingly, it is desirable to cover the RF anti-reflection coating with a third, outer coating that reduces reflections at the air-to-fused silica boundary. Referring again to FIG. 2, the outermost anti-reflection coating 319 has a dielectric constant (index of refraction) designed to minimize reflections at the air-to-fused silica boundary. Consequently, while the outermost anti-reflection coating 319 is a thin, IR anti-reflection coating like the innermost anti-reflection coating 317, the dielectric constant of coating 319 is not the same as that of inner coating 317. Coating 319 can be constructed from one or more layers, having an overall thickness on the order of a fraction of a micron, making coating 319 essentially inconsequential to RF wavelengths but effective at IR wavelengths. Any of the previously listed materials ($HfO_2$, $Y_2O_3$, $MgF_2$, and ZnSe) or other materials can be used in the one or more layers. $MgF_2$ is a good candidate, particularly in a single-layer design, and results in a reflectivity of less than two percent (an air to bare fused silica reflection is on the order of 3.6%). A multilayer design can achieve even lower reflectivity. A prism device constructed in this manner can achieve a transmission greater than 85% in both the infrared and RF bands even for extreme steering angles.

While the anti-reflection coating scheme described in connection with FIG. 2 includes three successive coatings, it will be appreciated that the invention is not limited to any particular anti-reflection coating arrangement, and any arrangement that results in an acceptable level of reflection and transmission within a system is permissible. Moreover, while specific materials have been mentioned for the IR and RF anti-reflection coatings, it will be understood that the invention is not limited to any particular materials, number of coatings, number of layers within a coating, or thicknesses of coatings or layers, provided the anti-reflection coating scheme provides acceptable transmission and reflection properties. For example, other coating materials, such as $Al_2O_3$, may be useful in conjunction with certain prism materials and other coating materials to prevent reflection and improve transmission. Moreover, while the RF anti-reflection coating described in the exemplary embodiment is a single-layer coating, it will be appreciated that the invention is not limited a single-layer RF anti-reflection coating, and RF anti-reflection coatings comprising multiple layers can be constructed with appropriate materials.

Figure 3:
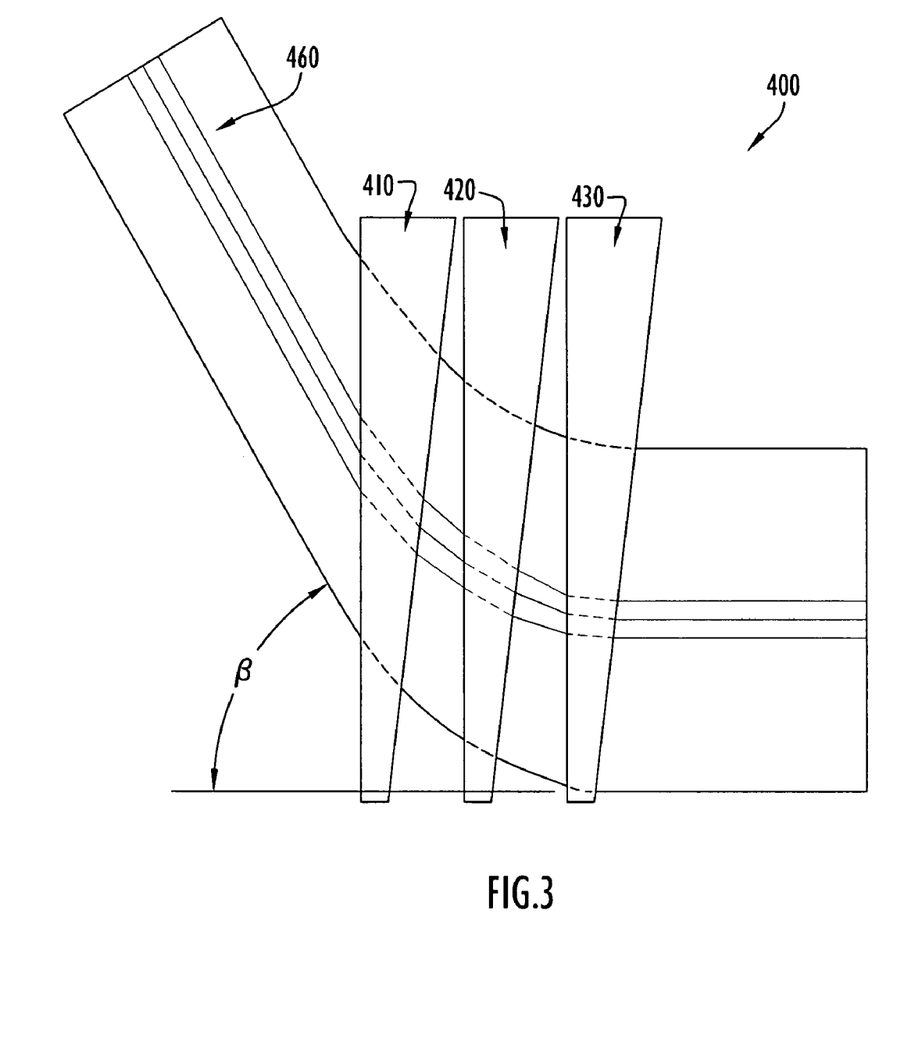
FIG. 3 is a cross-sectional side view of a prism assembly for steering electromagnetic beams over a field of regard.

FIG. 3 illustrates a beam steering assembly 400 constructed from three prism devices, which is capable of simultaneously steering both an RF beam and an optical beam in the same direction. For simplicity, the prism devices' anti-reflection coatings are not explicitly depicted in FIG. 3. The prisms can be arranged and operate in the manner of Risley prisms, as described above. Specifically, three independently rotatable prism devices 410, 420, and 430 are arranged in series, such that incident electromagnetic beams 460 sequentially pass through each of the three prism devices and are deflected according to the relative orientation of the prism devices. By selectively rotating the prism devices, the beams can be directed at any angle within a field of regard to transmit and/or receive from different angles and, if necessary, track an object (e.g., a target or receiver device) whose relative angle to the prism assembly varies over time. The beam steering assembly can have, for example, a maximum deviation angle β of approximately 60° relative to the incident beam, resulting in a field of regard of about 120°. Of course, the invention is not limited to any particular maximum deviation or field of regard.

Figure 5:
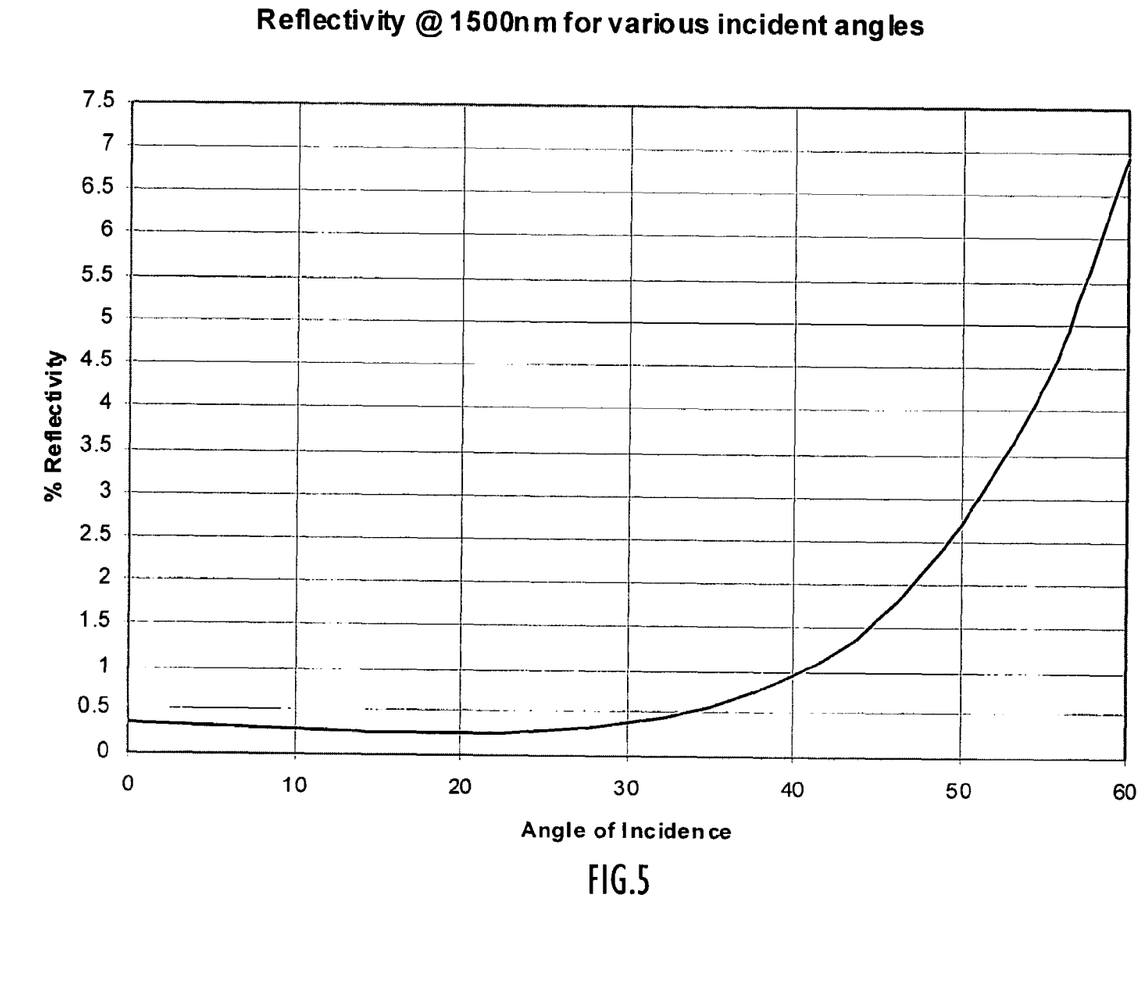
FIG. 5 is a graph showing the relationship between the angle of incidence and percent (%) reflectivity.

With the arrangement shown in FIG. 3, the total loss in the three prisms can be approximately 0.5 dB at its maximum at the largest steering angle of 60°. Smaller angles can produce less loss. At IR wavelengths (e.g., 1.55 μm), the loss would be similar, but slightly higher. The addition of the fused silica can create more surfaces that need to be treated, which can cause the higher loss. The highest loss can be 1.0 dB for the maximum steering angle, and steering angles up to 35 degrees can experience a loss of less than 0.3 dB (see FIGS. 4 and 5). FIG. 5 illustrates the relationship between the angle of incidence (in degrees) and reflectivity. At greater steering angles, reflectivity begins to increase considerably. In practice, however, this reflectivity occurs only at the outermost surface. The other surfaces have angles of incidence less than 30°.

While FIG. 3 illustrates a particular beam steering assembly, it will be appreciated that the present invention is not limited to a Risley prism system or the use of three prism devices within a beam steering assembly, and virtually any combination of prism devices and corresponding control systems (e.g., positioners) capable of effectively simultaneously steering two, different-wavelength beams in the same direction over a field of regard can be constructed in accordance with the present invention. For example, a two prism beam steering assembly can be employed, taking into consideration the tradeoffs described above.

Figure 6:
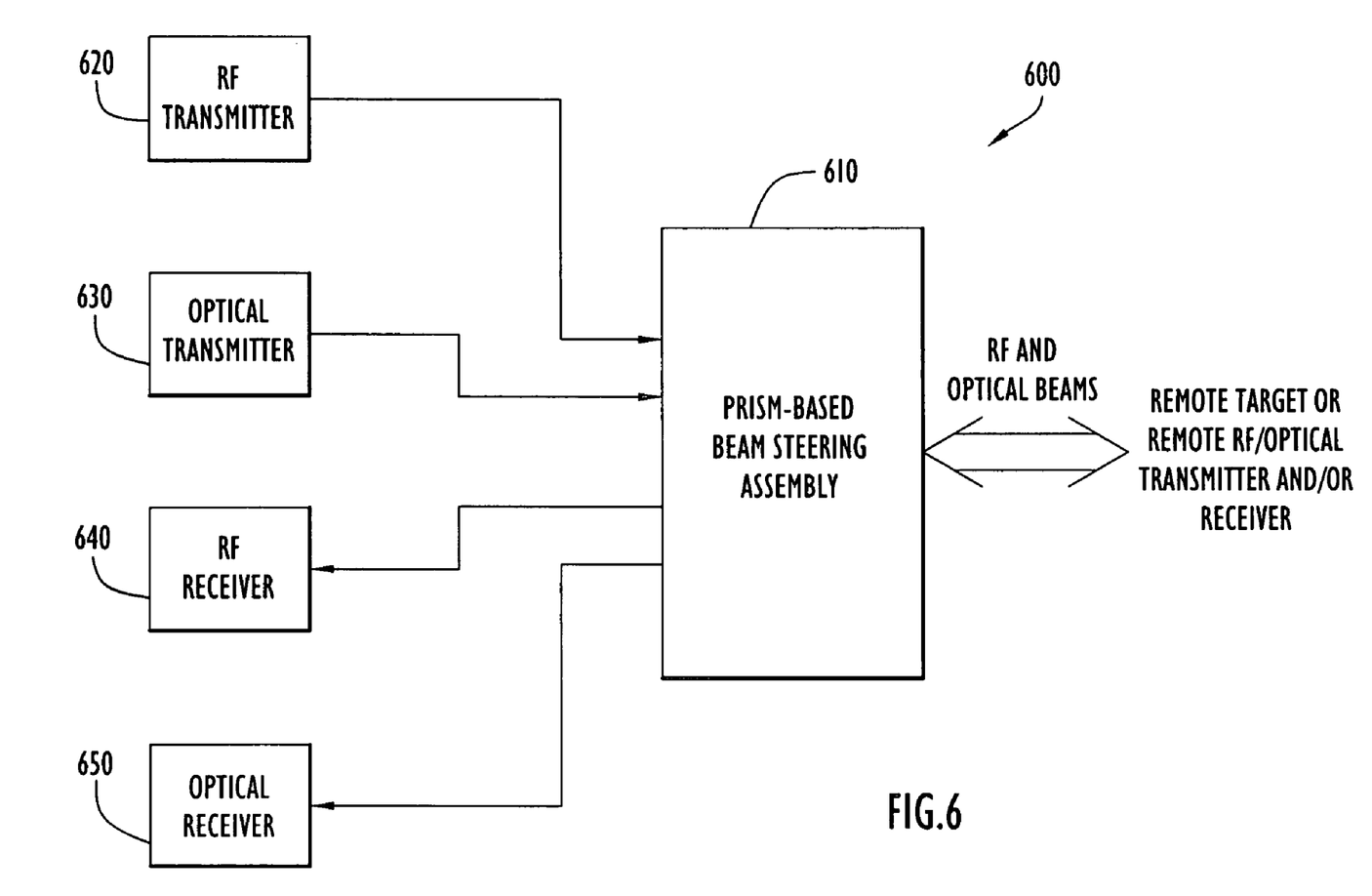
FIG. 6 is a functional block diagram of a beam steering system for simultaneously steering both RF and optical beams in the same direction.
Figure 7:
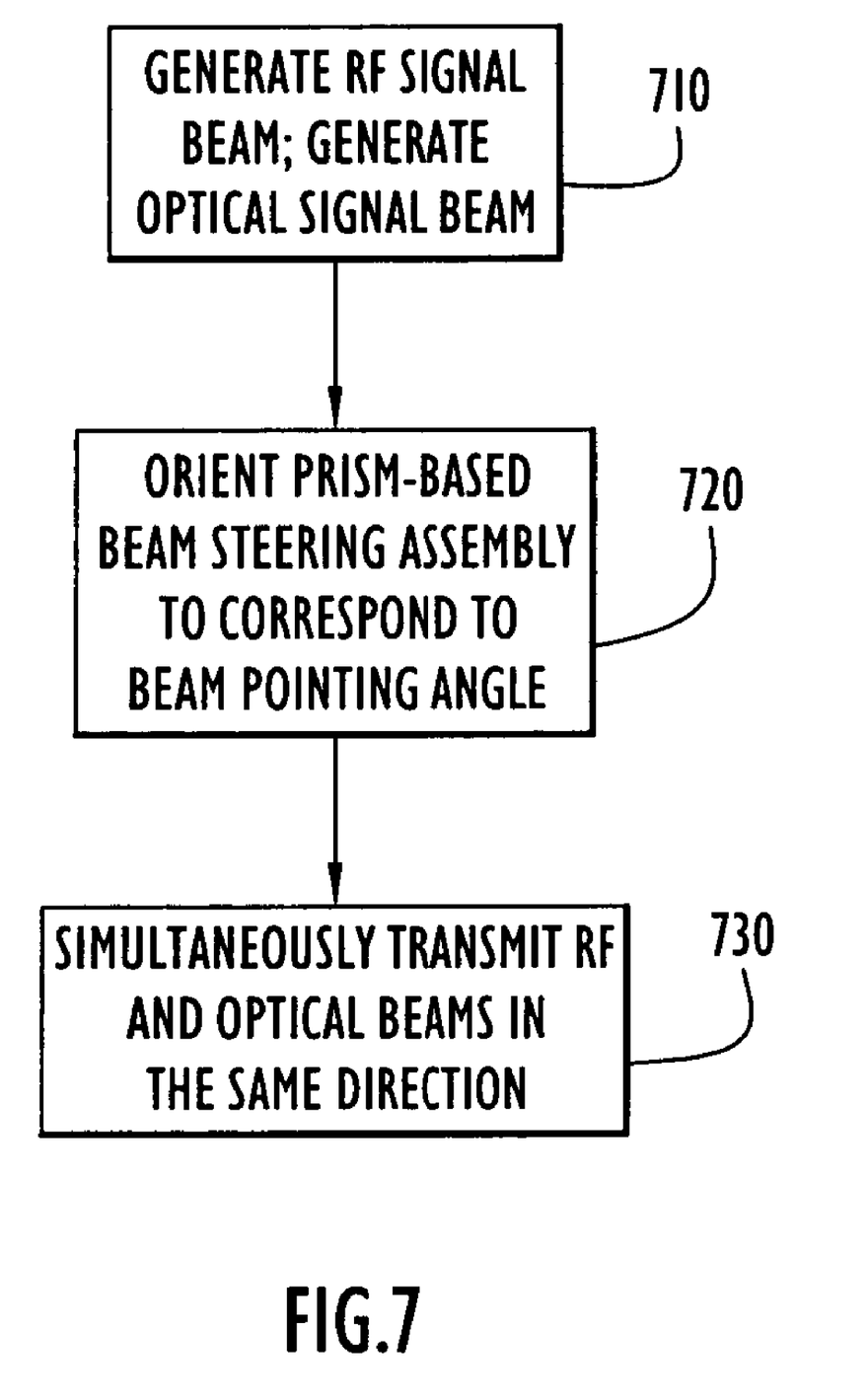
FIG. 7 is a functional flow diagram of operations performed to simultaneously transmit both RF and optical beams in the same direction.

A functional block diagram of a transmitter/receiver system 600 employing a prism-based beam steering assembly is shown in FIG. 6, and FIG. 7 illustrates, at a top level, the operations performed in simultaneously transmitting RF and optical signal beams using the system shown in FIG. 6. System 600 can be, for example, a communication system that operates at both RF (e.g., microwave) and optical (C-band) wavelengths, a remote sensing system, a combined electronic warfare (EW) and radar system, or virtually any type of system requiring beam pointing at two different wavelengths. Further, system 600 can be ground-based, airborne (e.g., mounted on an aircraft), satellite mounted, ship borne, or mounted on an undersea vehicle.

Prism-based beam steering assembly 610 can be constructed from two or more prism devices, as described above, where each prism device is constructed from a material having substantially the same index of refraction at the two operational wavelengths (e.g., silicon) and preferably includes anti-reflection coatings to minimize reflections. Typically, a navigation system that tracks the location or angle of distant objects (e.g., a target or receiver) with which the system is interacting, is used to control the beam pointing of the assembly 610 via positioners or the like. Such navigation systems and associated beam pointing control are well known.

An RF transmitter 620 and an optical transmitter 630 simultaneously supply an RF signal beam and a co-linear optical signal beam to beam steering assembly 610, respectively (operation 710 in FIG. 7). The RF and optical signals can be derived from the same source and contain the same or overlapping information, or the signals can be independent or completely different and contain no common information. Prior to transmitting the signal beams, the prism devices of beam steering assembly 610 are oriented to correspond to the beam pointing angle by a control system, as described above (operation 720 in FIG. 7). Beam steering assembly 610 then refracts the two signal beams, directing them at substantially the same angle into free space toward a remote target or a remote RF/optical receiver and/or transmitter (operation 730 in FIG. 3). The system may operate in a tracking mode to follow such objects as they move over time and also operate in a scan mode in search of such objects.

Similarly, an RF receiver 640 and an optical receiver 650 can be used to respectively receive RF and optical signal beams simultaneously arriving at the beam steering assembly 610. While shown in FIG. 6 in a system capable of transmitting and receiving, it will be appreciated that a prism-based beam steering assembly according to the present invention can be employed in an apparatus that only transmits or only receives signals.

Having described preferred embodiments of new and improved prism device and combined optical and radio frequency beam steering system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A prism device, comprising:
   a prism material having substantially the same index of refraction at an optical wavelength and a radio frequency (RF) wavelength;
   a first anti-reflection coating operable to reduce reflection of electromagnetic radiation at the optical wavelength; and
   a second anti-reflection coating operable to reduce reflection of electromagnetic radiation at the RF wavelength.

2. The prism device of claim 1, wherein the first anti-reflection coating comprises at least one of: $HfO_2$, $Y_2O_3$, $MgF_2$, and ZnSe.

3. The prism device of claim 1, wherein the first anti-reflection coating comprises a plurality of layers.

4. The prism device of claim 1, wherein the second anti-reflection coating has an effective thickness of approximately a quarter of the RF wavelength.

5. The prism device of claim 1, wherein the second anti-reflection coating comprises a single layer.

6. The prism device of claim 1, wherein the prism is wedge-shaped.

7. The prism device of claim 1, wherein the optical wavelength is an infrared (IR) wavelength.

8. The prism device of claim 1, wherein the second anti-reflection coating comprises a single layer of silicon dioxide.

9. The prism device of claim 1, wherein the second anti-reflection coating comprises a plurality of layers.

10. The prism device of claim 1, wherein the prism material comprises silicon.

11. The prism device of claim 1, wherein the first anti-reflection coating is between the prism material and the second anti-reflection coating.

12. The prism device of claim 1, further comprising:
    a third anti-reflection coating operable to reduce reflection of electromagnetic radiation at the optical wavelength, wherein the first anti-reflection coating is between the second anti-reflection coating and the prism material, and the second anti-reflection coating is between the first anti-reflection coating and the third anti-reflection coating.

13. A beam steering assembly for simultaneously directing signal beams of optical and radio frequency (RF) wavelengths, comprising:
    a plurality of controllable prism devices configured to refract incident signal beams, the controllable prism devices being arranged relative to each other such that signal beams traveling through the prism devices are steerable over a field of regard by selectively moving the prisms, wherein the controllable prism devices comprise:
    a prism material having substantially the same index of refraction at the optical wavelength and the RF wavelength;
    a first anti-reflection coating operable to reduce reflection of a first signal beam at the optical wavelength; and
    a second anti-reflection coating operable to reduce reflection of a second signal beam at the RF wavelength;
    wherein the controllable prism devices are capable of simultaneously directing the first and second signal beams in substantially the same direction.

14. The beam steering assembly of claim 13, wherein the controllable prism devices are arranged in series and are selectively rotatable to steer signal beams.

15. The beam steering assembly of claim 13, wherein the beam steering assembly comprises two controllable prism devices.

16. The beam steering assembly of claim 13, wherein the beam steering assembly comprises three controllable prism devices.

17. The beam steering assembly of claim 13, wherein the optical wavelength is an infrared (IR) wavelength.

18. The beam steering assembly of claim 13, wherein the second anti-reflection coating comprises a single layer of silicon dioxide.

19. The beam steering assembly of claim 13, wherein the second anti-reflection coating comprises a plurality of layers.

20. The beam steering assembly of claim 13, wherein the prism material comprises silicon.

21. The beam steering assembly of claim 13, wherein the first anti-reflection coating is between the prism material and the second anti-reflection coating.

22. The beam steering assembly of claim 13, further comprising:
    a third anti-reflection coating operable to reduce reflection of electromagnetic radiation at the optical wavelength, wherein the first anti-reflection coating is between the second anti-reflection coating and the prism material, and the second anti-reflection coating is between the first anti-reflection coating and the third anti-reflection coating.

23. The beam steering assembly of claim 13, wherein the beam steering assembly is employed in at least one of: a communication device; a remote sensing system; and an optical/RF instrument.

24. The beam steering assembly of claim 13, wherein the beam steering assembly is employed in an airborne system.

25. The beam steering assembly of claim 13, wherein the beam steering assembly is employed in an undersea vehicle.

26. A beam steering system, comprising:
the beam steering assembly of claim 13;
a first transmitter configured to generate the first signal beam; and
a second transmitter configured to generate the second signal beam.

27. A beam steering system, comprising:
the beam steering assembly of claim 13, wherein the beam steering assembly simultaneously receives the first and second beams;
a first receiver configured to process the first signal beam; and
a second receiver configured to process the second signal beam.

28. A method of manufacturing a prism device, comprising:
(a) forming a prism from a prism material having substantially the same index of refraction at an optical wavelength and a radio frequency (RF) wavelength;
(b) forming a first anti-reflection coating over the prism, the first anti-reflection coating reducing reflection of electromagnetic radiation at the optical wavelength; and
(c) forming a second anti-reflection coating over the prism, the second anti-reflection reducing reflection of electromagnetic radiation at the RF wavelength.

29. The method of claim 28, wherein (c) includes forming the second anti-reflection coating over the first anti-reflection coating.

30. The method of claim 28, wherein the optical wavelength is an infrared (IR) wavelength.

31. The method of claim 28, wherein (c) includes forming the second anti-reflection coating as a single layer of silicon dioxide.

32. The method of claim 28, wherein (c) includes forming the second anti-reflection coating as a plurality of layers.

33. The method of claim 28, wherein (a) includes forming the prism from silicon.

34. The method of claim 28, further comprising:
(d) forming a third anti-reflection coating over the prism, the third anti-reflection coating reducing reflection of electromagnetic radiation at the optical wavelength, wherein the first anti-reflection coating is between the second anti-reflection coating and the prism material, and the second anti-reflection coating is between the first anti-reflection coating and the third anti-reflection coating.

35. A method of simultaneously directing signal beams of optical and radio frequency (RF) wavelengths, comprising:
generating a first signal beam at the optical wavelength;
generating a second signal beam at the RF wavelength; and
simultaneously passing the first and second signal beams through a beam steering assembly comprising a plurality of controllable prism devices, wherein the controllable prism devices comprise: a prism material having substantially the same index of refraction at the optical wavelength and the RF wavelength, such that the beam steering assembly simultaneously directs the first and second signal beams in substantially the same direction.

36. A prism device, comprising:
means for refracting electromagnetic radiation, the means for refracting having substantially the same index of refraction at an optical wavelength and a radio frequency (RF) wavelength;
means for reducing reflection of electromagnetic radiation at the optical wavelength; and
means for reducing reflection of electromagnetic radiation at the RF wavelength.

37. The method of claim 35, wherein the first and second signal beams are simultaneously passed through the beam steering assembly comprising the plurality of controllable prism devices, wherein the controllable prism devices include first and second anti-reflection coatings for reducing reflections of electromagnetic radiation at the optical and RF wavelengths, respectively.

38. The prism device of claim 36, wherein the optical wavelength is an infrared (IR) wavelength.

39. The prism device of claim 37, wherein the means for reducing reflection of electromagnetic radiation at the optical wavelength comprises a plurality of layers.

40. The prism device of claim 37, wherein the means for reducing reflection of electromagnetic radiation at the RF wavelength comprises a single layer.

41. The prism device of claim 37, wherein the means for reducing reflection of electromagnetic radiation at the RF wavelength comprises a plurality of layers.

* * * * *